United States Patent [19]

Sproat, Jr.

[11] Patent Number: 4,497,353
[45] Date of Patent: Feb. 5, 1985

[54] MULTIPURPOSE MATERIAL WORKING TOOL
[76] Inventor: William B. Sproat, Jr., 1763 Maple St., Salem, Ohio 44460
[21] Appl. No.: 300,757
[22] Filed: Sep. 10, 1981
[51] Int. Cl.³ .............................................. B27C 9/00
[52] U.S. Cl. .............................. 144/1 R; 144/286 R; 144/1 C; 83/471.3; 29/27 C; 142/53
[58] Field of Search ............ 144/286 C, 1 R, 1 B, 144/1 C, 35 R; 83/477.1, 471.3, 4471.2, 486, 486.1; 408/22, 24, 25, 28, 29, 77, 78, 88; 29/26 R, 26 A, 26 B, 27 R, 27 A, 27 C; 142/53

[56] References Cited
U.S. PATENT DOCUMENTS

| | | | |
|---|---|---|---|
| 2,200,799 | 5/1940 | Miller | 144/1 C |
| 2,619,135 | 11/1952 | Callaway | 144/48 |
| 3,116,769 | 1/1964 | Gunderson | 142/53 |
| 3,299,918 | 1/1967 | Howey | 144/1 C |
| 3,586,079 | 6/1971 | Collins et al. | 408/88 |
| 3,797,542 | 3/1974 | Wood | 144/35 |
| 3,981,605 | 9/1976 | Wirsing | 408/88 |
| 3,988,814 | 11/1976 | Hoffman | 144/1 C |
| 4,318,432 | 3/1982 | Howey | 144/35 R |

Primary Examiner—W. D. Bray
Assistant Examiner—Jorji M. Griffin
Attorney, Agent, or Firm—Frank J. Troy, Sr.

[57] ABSTRACT

A multipurpose material working tool includes a frame on which is mounted a headstock having a spindle extending axially therefrom which is adapted to receive various rotary tools and a radial trolley adapted to move on ways toward and away from the headstock. The radial trolley is equipped with a tail stock to be used in conjunction with a face plate or headstock spur center attached to the spindle and can also be equipped with various radial tools for performing work on materials located either on the bed of the trolley or in movable radial support stands attached to the frame. The multipurpose material working tool can also include a band saw secured to the frame at a position adjacent to the work headstock and which is adapted to be driven by the same motor as that which drives the work headstock.

12 Claims, 5 Drawing Figures

MULTIPURPOSE MATERIAL WORKING TOOL

BACKGROUND OF THE INVENTION

The invention relates to a multipurpose material working tool. More particularly, the invention relates to a multipurpose material working tool or machine tool which is capable of performing a wide range of material working, especially woodworking operations, such as drilling, sawing, turning, routing, shaping and the like and which can easily and rapidly be set up to perform such operations.

Multipurpose woodworking machines or tools are known in the prior art as illustrated by U.S. Pat. Nos. 1,973,409; 2,109,061; 2,623,269; 2,661,037; 2,662,566; 2,792,858; 2,905,211; 2,913,021; 3,352,334 and 3,771,579.

However, the multipurpose woodworking machines described in the aforementioned patents do not have the versatility and capability of being rapidly converted to different setups as exhibited by the material working tool of this invention.

SUMMARY OF THE INVENTION

In accordance with the present invention, a multipurpose material working tool which is extremely versatile and which can be easily and rapidly set up to perform a variety of work operations, especially woodworking operations, is provided.

The multipurpose material working tool includes a frame on which is mounted a headstock having a spindle extending axially therefrom which is adapted to receive various rotary tools and a radial trolley adapted to move on longitudinal ways toward and away from the headstock. The radial trolley is equipped with a tail stock to be used in conjunction with a face plate or head stock spur center attached to the headstock spindle, and can also be equipped with various radial tools for performing work on materials located either on the trolley bed or in one or more movable work supporting stands attached to the frame. If desired, the tool can be equipped with either a second radial trolley or a non-radial trolley.

Various rotary tools can be mounted on the headstock spindle, including a head stock spur center, planar, joiner, sander, grinder and the like. The trolley can also be equipped with various radial tools such as radial saws, radial drills, tilt arbor saws, radial routers and the like.

The multipurpose material working tool of the invention can also include a band saw secured to the frame at a position adjacent to the headstock and which is adapted to be driven by the same motor which drives the headstock.

In addition, the material working tool is equipped with a work supporting table to be utilized in cooperation with rotary tools mounted on the headstock. Other work supporting tables may be secured to the frame section of the tool if desired.

The material working tool can be operated by several persons or by a single person requiring several job setups at the same time. Simultaneous operations can be conducted using the tool. The length of the frame portion of the tool can be varied if desired. Thus, the length of the frame can be expanded or contracted, depending on space availability. All components can be stored on the frame and easily positioned for use.

Additional advantages and features of the invention will become apparent from the following description of the drawings.

DETAILED DESCRIPTION OF THE INVENTION

Figure 1:
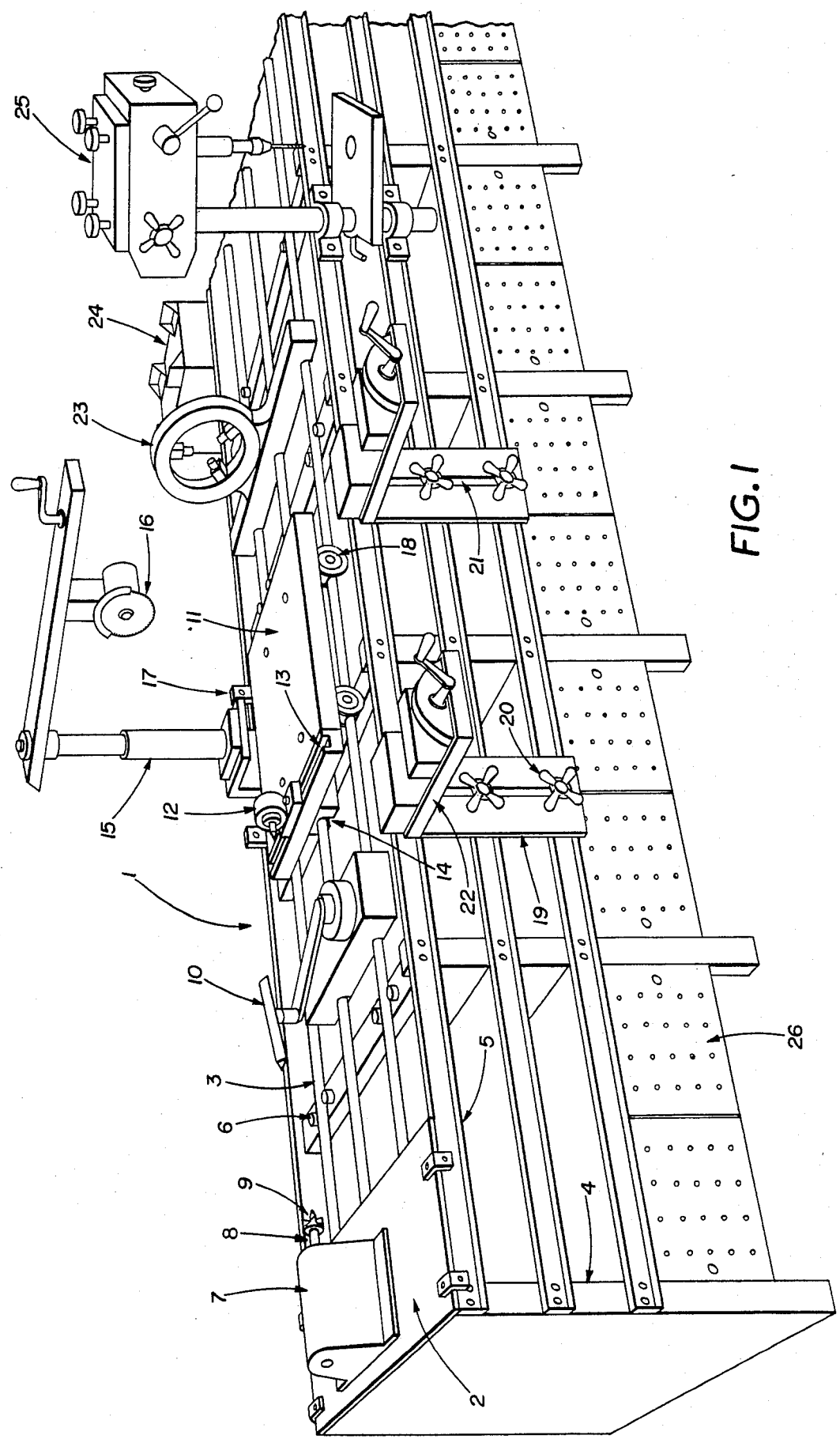
FIG. 1 is a perspective view of a multipurpose material working tool of the invention.

One embodiment of the material working tool of the invention is illustrated in FIG. 1. The tool includes a frame which is generally designated by the numeral 1. Frame 1 includes an end table portion 2 and three ways designated generally by the numeral 3. The ways run longitudinally along the frame and in parallel relationship to each other in the same plane. For convenience, the ways are referred to hereinafter as longitudinal ways. Frame 1 also includes vertical support members which are generally designated by the numeral 4 and horizontal support members which are generally designated by the numeral 5. As shown in this drawing, there are two lines appearing at the top and bottom of the horizontal support members 5. These are actually channels which can be utilized to move members horizontally along the frame. Longitudinal ways 3 are stabilized to prevent side to side movement by way guides which are generally designated by the numeral 6. The way guides may be of any convenient material such as wood, metal or plastic and are secured to the vertical support members 5 by bolts or screws. Alternatively, if desired, way supports (not shown) may be utilized in place of the way guides. These may be in the form of blocks containing channels into which the ways are inserted with the blocks being secured to the vertical support members in the same fashion as the way guides. When way guides are used, the longitudinal ways 3 are further stabilized by securing them to the vertical support members 4 by means of bolts (not shown).

Figure 5:
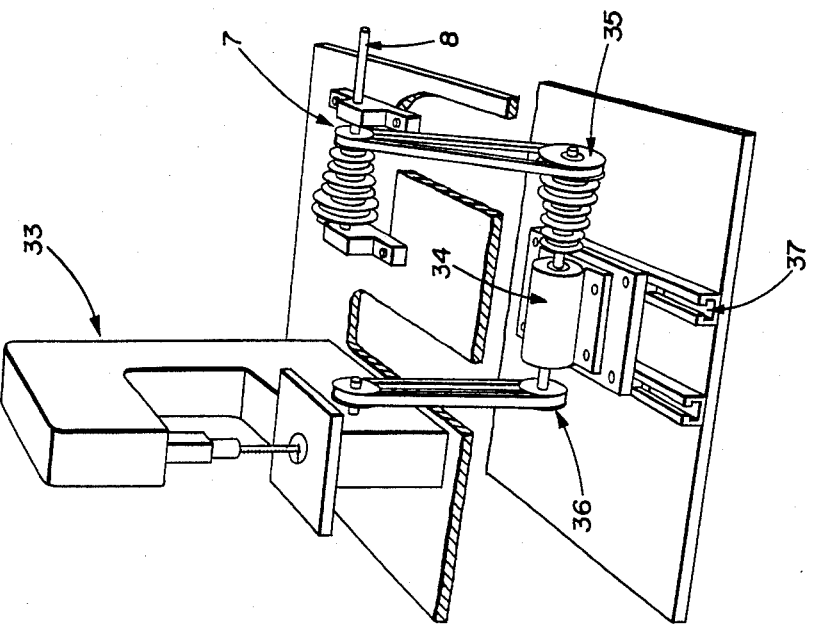
FIG. 5 is a partial view in perspective with a portion of the tool cut away to show a single motor adapted to drive both the headstock and the band saw.

Anchored to end table portion 2 of Frame 1 is a headstock 7 which is powered by motor 34 shown in FIG. 5. As will be evident, the headstock is not clearly visible in this drawing figure since it is hidden by the headstock cover. A clearer view of the headstock can be seen in FIG. 5.

Figure 2:
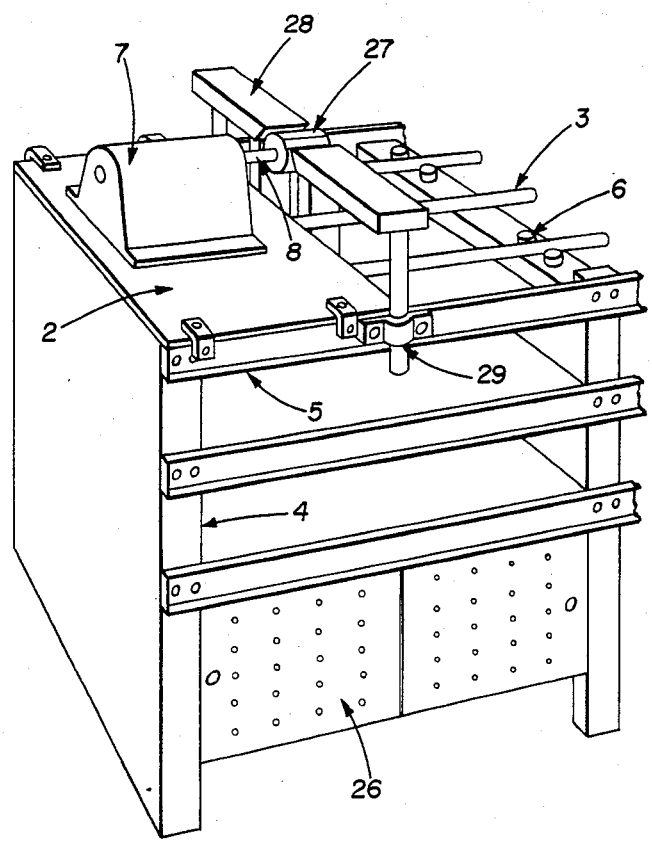
FIG. 2 is a partial view in perspective showing an alternate embodiment of the invention in which a shaper is attached to the headstock spindle.

Extending axially fron headstock 7 is a spindle designated by the numeral 8. Mounted on the spindle is a face plate or head stock spur center 9. However, as will be appreciated, the head stock spur center can be replaced with a variety of rotary tools including a shaper, sander, grinder and the like. The head stock spur center or other rotary tool can be secured to the headstock spindle by any convenient means such as set screws and the like. An alternate embodiment in which the head stock spur center is replaced with a shaper is shown in FIG. 2.

A tool rest 10 is provided for use when as in this embodiment the tool is employed as a lathe. The tool rest is adapted to be moved along longitudinal ways 3 by channels which are cut in the underside thereof.

Mounted on longitudinal ways 3 is a radial trolley generally designated by the numeral 11. The radial trolley is adapted to move toward and away from the headstock 7 along the longitudinal ways 3 on rollers 18. The rollers are provided with a curved surface (not shown) in order to permit easy movement along the ways. The trolley is also equipped with two retaining guides 14 attached to the underside of the trolley in order to provide more controlled movement of the trolley on the ways. As viewed from the end table top or headstock, the retaining guides are located at the front and rear of the trolley. The retaining guides are equipped with channels adapted to ride on the middle longitudinal way. The radial trolley is also equipped with a braking mechanism (not shown) to permit positioning of the trolley at any desired point along the ways.

Radial trolley 11 is additionally equipped with a movable tail stock 12 for use in conjunction with the head stock spur center. The tail stock is movable along the front edge of the trolley by virtue of channel means 13. The tail stock contains a locking mechanism (not shown) which permits it to be locked in place for use with the head stock spur center or to be secured out of the way in order to utilize the trolley bed for other operations (e.g., sawing, drilling, etc.). As will be apparent, the use of a trolley equipped with a tail stock provides the significant advantage of being able to turn very long materials.

Radial trolley 11 is also equipped with a radial arm 15 which is adapted to move in a vertical and circumferential direction in relationship to the upper surface or bed of the trolley. As depicted in FIG. 1, a removable tilt radial saw 16 is attached to radial arm 15. However, it should be noted that the tilt radial saw can be replaced with a radial drill, a radial router and the like. The radial saw or other described tools can be utilized either to perform work on a material located on the trolley bed or on one or more adjustable work supporting stands generally designated by the numeral 19 which are attached to horizontal support members 5. The radial trolley 11 is also equipped with movable fence guides 17 which can be utilized to square up a work material. The radial trolley is also equipped with a motor and electrical extension cord attachment, neither of which are shown in the drawings as they are conventional components.

The adjustable work supporting stands 19 include material holding vises 22, locking nuts 20 and slots 21. These are vertically adjustable by means of the slots and can also be adapted for horizontal movement along the channels attached to horizontal support members 5. The work supporting stands are an extremely important feature of the material working tool of the invention since they permit the full utilization of the radial tools attached to the radial trolley. It should further be noted that the work supporting stands can be further utilized to easily provide additional tables for the material working tool.

The material working tool of the invention also includes a wood steady rest 23 which can be utilized when work operations are performed on extremely long materials. The tool also includes a radial saw storage rack 24, a radial drill storage station 25 and other tool storage bins designated by the numeral 26.

In FIG. 2, an alternate embodiment of the multipurpose material working machine tool of the invention in which the head stock spur center is replaced with a shaper 27 is illustrated. A movable table 28 is disposed at a 90° angle to the shaper to provide support for the work material during shaping operations. The table is provided with a gap in order to provide space for the shaper. As illustrated in the drawing, the segments of the table are secured to horizontal support members 5 by means of clamps 29. In instances where it is desired to utilize the head stock spur center 9 as in FIG. 1, the table can be removed and secured at a convenient point on end table 2.

Figure 3:
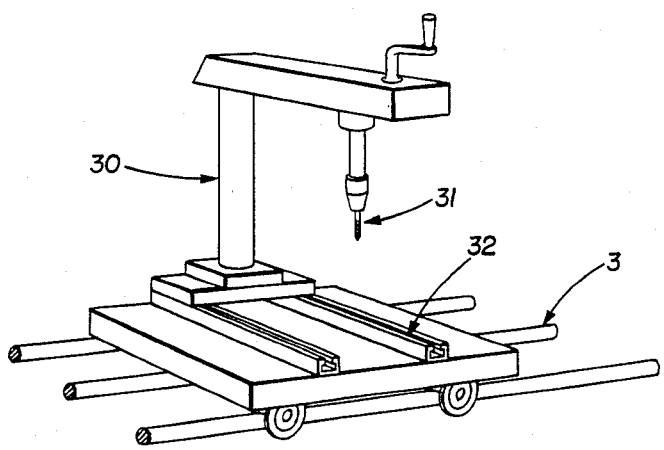
FIG. 3 is a perspective view of a non-radial trolley of the invention in which the tool mounted thereon is adapted to move in a direction perpendicular to the line of trolley travel.

In FIG. 3, a non-radial trolley which can be utilized on the material working tool of the invention is illustrated. The trolley includes a fixed arm 30 which is adapted to receive various tools. As illustrated in the drawing, a drill 31 is attached to the arm. The trolley is adapted for movement along longitudinal ways 3 in a manner similar to that of the radial trolley. In addition, the arm 30 is mounted in channels designated by the numeral 32 on the bed of the trolley. This permits movement of the arm in a direction perpendicular to the line of trolley movement. The arm can be locked at any point on the trolley bed by a locking mechanism (not shown).

Figure 4:
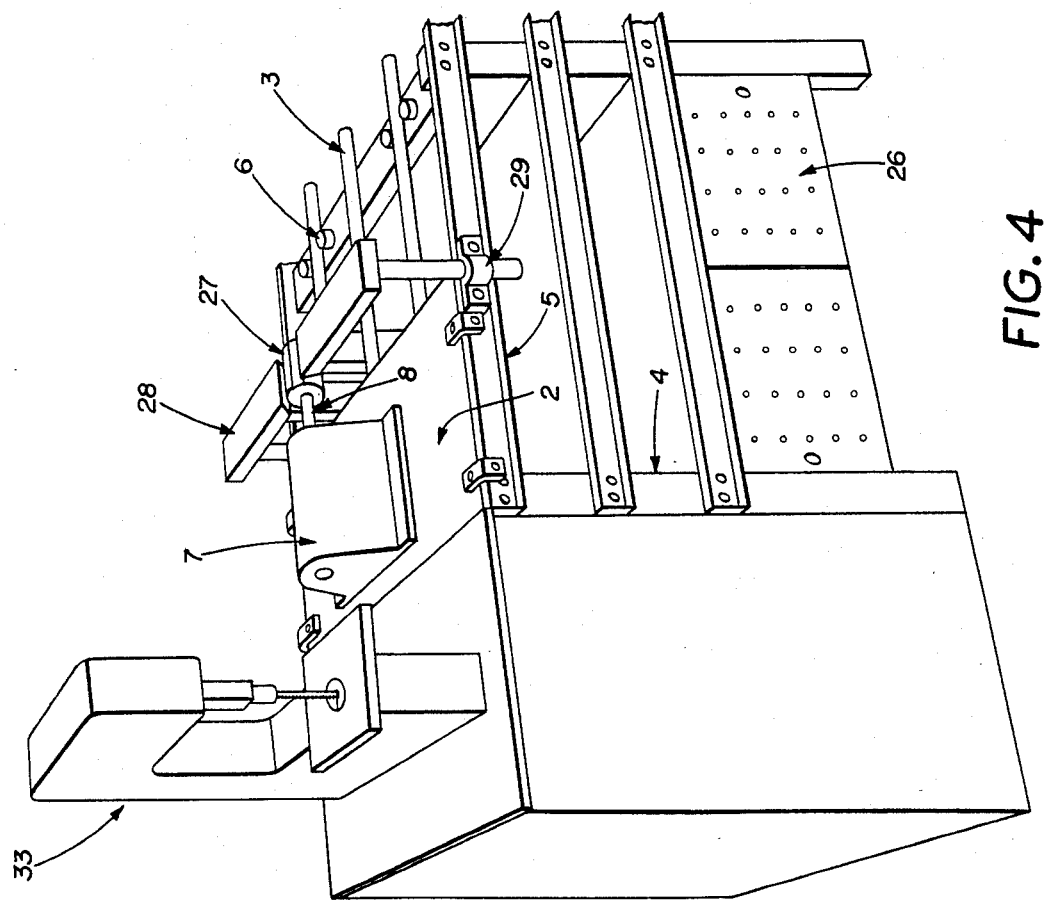
FIG. 4 is a partial view in perspective showing an alternative embodiment of the material working tool of the invention in which a band saw is added to the tool.

FIGS. 4 and 5 illustrate an alternate embodiment of the invention. In FIG. 4, a conventional band saw 33 is incorporated into the material working tool of this invention by attaching it to the vertical support member 4 at the end table portion 2 of the frame. The band saw 33 is powered by the same motor utilized to power the headstock 7 as shown in FIG. 5.

In FIG. 5, a motor 34 is equipped with a four (4) step pulley 35 which is adapted by means of a belt to turn the shaft of the headstock 7. The motor is also equipped with a single step pulley 36 which is adapted by means of a belt to turn the shaft of the band saw 33. The motor 34 is mounted in channels designated generally by the numeral 37. This permits the motor to be movably adjustable in order to provide proper tension on the pulley belts. A locking mechanism (not shown) is also included to permit the motor to be locked in place at the desired point in the channels.

In addition to the above-mentioned features, the multipurpose machine tool of the invention has many other advantageous features. Thus, for example, the trolley can be equipped with a removable vernier and a fixed scale can be attached to the frame adjacent to the direction of trolley movement. This presents accurate measurement of the work material and precise determination of points on the material upon which drilling, dadoing and other similar operations are to be performed. The tool can also be equipped with a vacuum system to remove dust, shavings and the like. Moreover, a very important advantage of the multipurpose machine tool is that it is designed in such a manner so as to permit the tilt radial arm saw, the drill and the router to be removed completely from the apparatus and to be used independently for other drilling, routing and sawing operations.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A multipurpose material working tool comprising a supporting frame having an end table portion and three longitudinal ways, a headstock anchored to the end table portion of the frame, a rotatable spindle extending axially from the headstock, a motor adapted to drive the rotatable spindle, a head stock spur center secured to the rotatable spindle, a lathe tail stock attached to a radial trolley which is adapted to ride on the longitudinal ways and to be moved thereon toward and away from the headstock, a radial arm secured to the radial trolley and adapted to move in a vertical and circumferential direction in relationship to the upper surface of the radial trolley and a tilt radial saw attached to the radial arm.

2. The multipurpose material working tool of claim 1 wherein the radial trolley is equipped with two retaining guides secured to the underside of the trolley and adapted to ride on the middle longitudinal way.

3. The multipurpose material working tool of claim 1 wherein the lathe tail stock is movable across the side of the trolley and adapted to be locked in place.

4. The multipurpose material working tool of claim 1 further comprising way guides or way supports secured to frame support members.

5. A multipurpose material working tool comprising a supporting frame having an end table portion and three longitudinal ways, a headstock anchored to the end table portion of the frame, a rotatable spindle extending axially from the headstock, a motor adapted to drive the rotatable spindle, a head stock spur center secured to the rotatable spindle, a lathe tail stock attached to a radial trolley which is adapted to ride on the longitudinal ways and to be moved thereon toward and away from the headstock, a radial arm secured to the radial trolley and adapted to move in a vertical and circumferential direction in relationship to the upper surface of the radial trolley and a radial drill press attached to the radial arm.

6. The multipurpose material working tool of claim 5 wherein the radial trolley is equipped with two retaining guides secured to the underside of the trolley and adapted to ride on the middle longitudinal way.

7. The multipurpose material working tool of claim 5 further comprising way guides or way supports secured to the frame support members.

8. The multipurpose material working tool of claim 5 wherein said lathe tail stock is movable across the side of the trolley and adapted to be locked in place.

9. A multipurpose material working tool comprising a supporting frame having an end table portion and three longitudinal ways, a band saw secured to a vertical support member of said end table, a headstock anchored to said end table, a rotatable spindle extending axially from the headstock, a motor adapted to drive both the band saw and rotatable spindle, a work supporting table disposed at a 90° angle to said rotatable spindle, and a rotary tool attached to said spindle said tool further comprising a radial trolley adapted to ride on said longitudinal ways, such radial trolley being equipped with a lathe tail stock, a radial arm adapted to move in a vertical and circumferential direction to the surface of the radial trolley, and a removable radial saw, tilt arbor saw or radial drill press attached to said radial arm.

10. The multipurpose material working tool of claim 9 wherein said rotary tool is a planer.

11. The multipurpose material working tool of claim 10 further comprising one or more vertically and horizontally adjustable work supporting stands secured to the supporting frame.

12. The multipurpose material working tool of claim 10 further comprising a pair of vertically and horizontally adjustable work supporting stands secured to the supporting frame.

* * * * *